Feb. 2, 1965 E. G. FERRIS 3,168,267
AERIAL-DROP DEVICE
Filed May 14, 1963 2 Sheets-Sheet 1
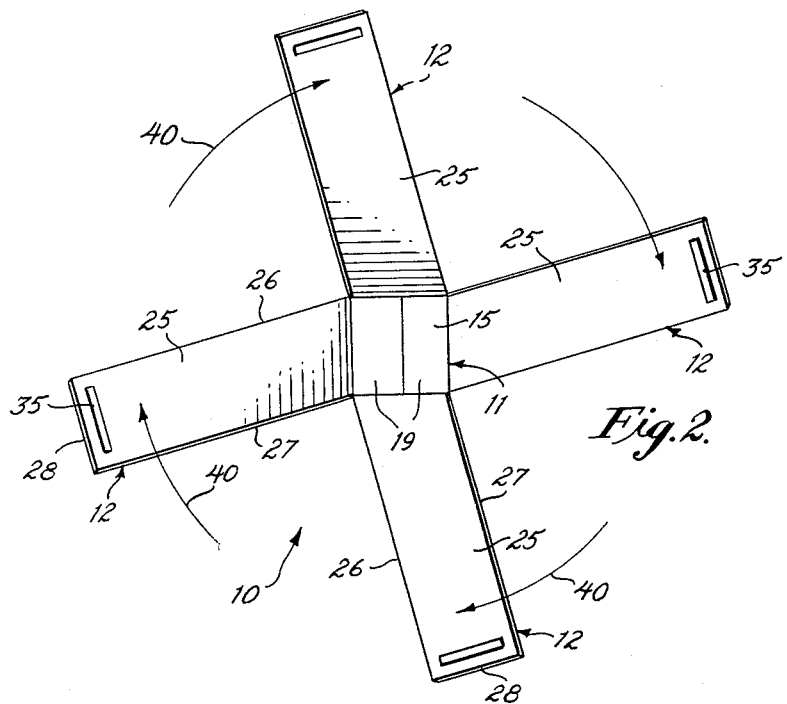
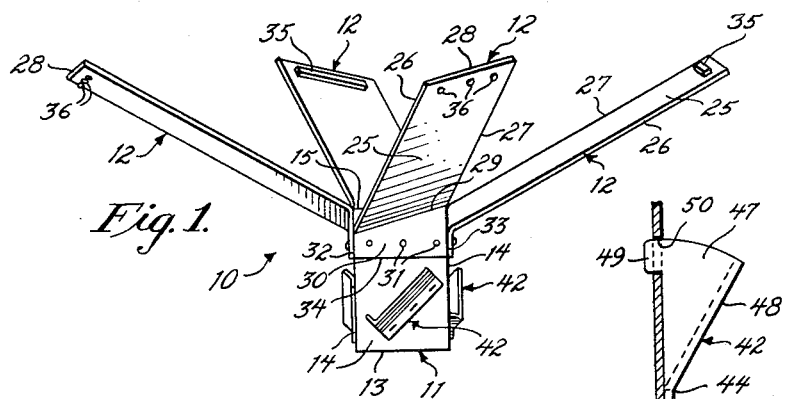
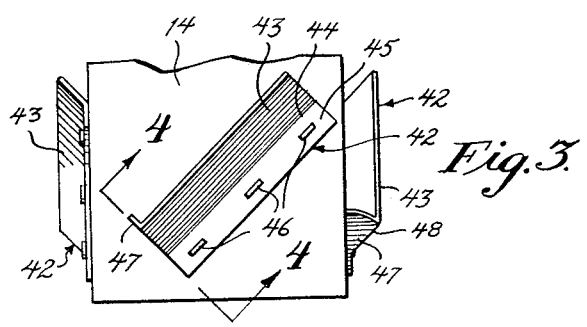
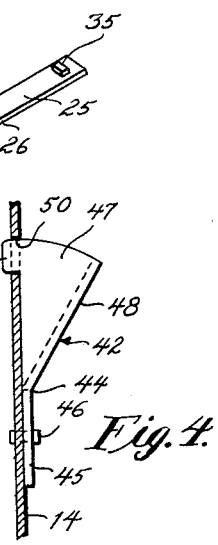
INVENTOR.
EDWARD G. FERRIS
BY Robert K. Youtie
ATTORNEY Feb. 2, 1965    E. G. FERRIS    3,168,267
AERIAL-DROP DEVICE
Filed May 14, 1963    2 Sheets-Sheet 2
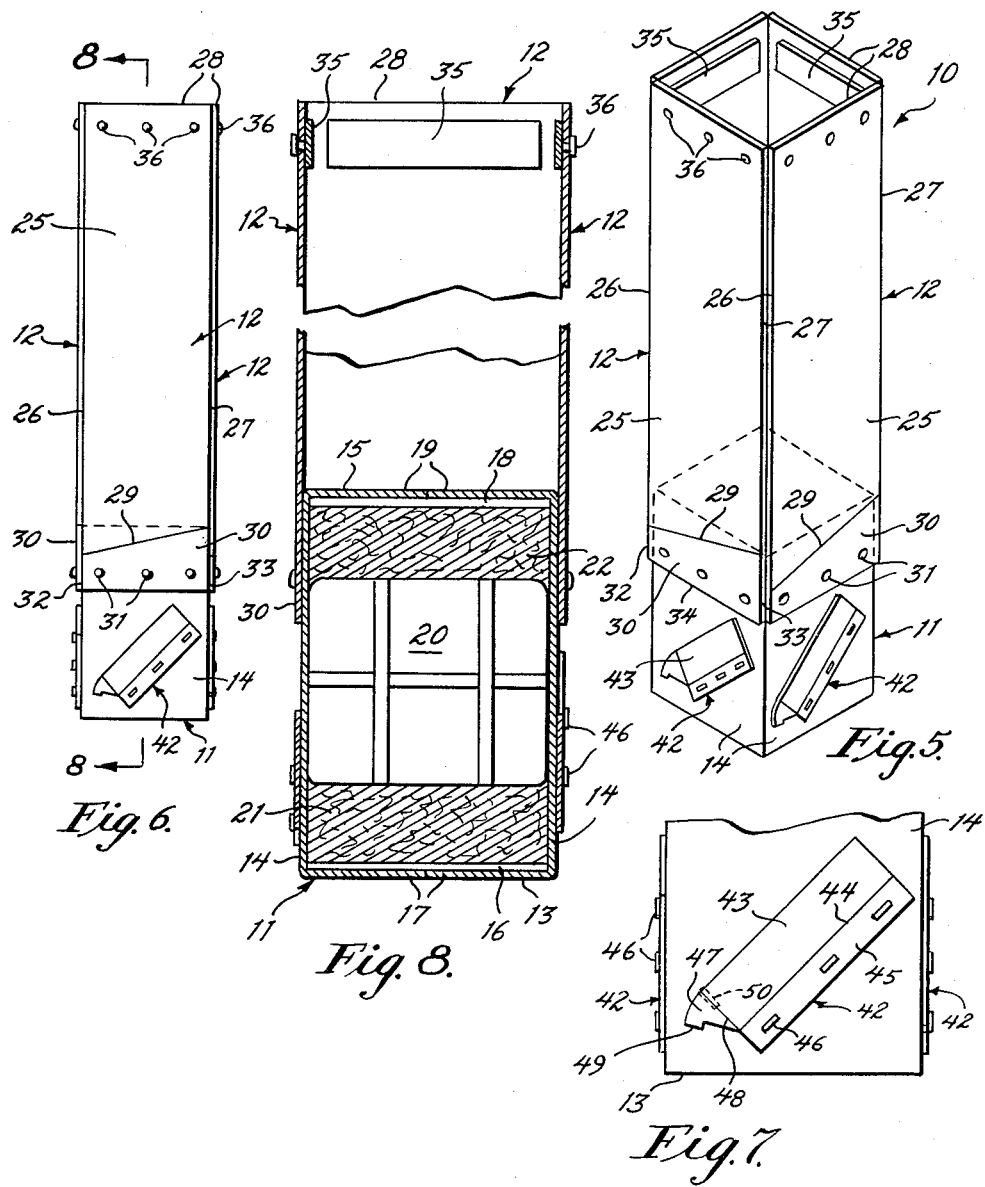
INVENTOR.
EDWARD G. FERRIS
BY Robert K. Youtie
ATTORNEY.

United States Patent Office 3,168,267
Patented Feb. 2, 1965

3,168,267
AERIAL-DROP DEVICE
Edward G. Ferris, Apr. 40–A, Paulsboro Gardens,
Paulsboro, N.J.
Filed May 14, 1963, Ser. No. 280,328
4 Claims. (Cl. 244—138)

This invention relates generally to aerial-drop devices of the type adapted for dropping supplies and other loads from aircraft to the ground.

As is well known, aerial-drop devices of the type described are particularly advantageously employed in many situations, both during war and peacetime. Wherever it is necessary to deliver materials and supplies to relatively inaccessible locations, as in jungle warfare, during rescue operations, and in many other such situations, aerial-drop devices must be employed.

Toward this end, a wide variety of aerial-drop devices have been proposed, but all of these prior devices have been unsatisfactory in certain respects. For example, the prior devices were often of relatively expensive construction so their use and expendability was limited, and prior devices were also relatively complex so that their operation was not sufficiently reliable.

Accordingly, it is an important object of the present invention to provide an aerial-drop device which overcomes the above-mentioned difficulties, is extremely economical in manufacture so as to be readily expendable after a single use, and which is extremely simple and sturdy in construction to insure reliability under all conditions of operation.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a side elevational view showing an aerial-drop device constructed in accordance with the teachings of the present invention, and illustrating the device in its operative dropping condition;

FIGURE 2 is a top plan view of the device of FIGURE 1, arrows indicating the direction of spiral rotation of the device during drop;

FIGURE 3 is a partial side elevational view, somewhat enlarged, illustrating certain details of construction;

FIGURE 4 is a fragmentary sectional view taken generally along the line 4—4 of FIGURE 3;

FIGURE 5 is a top perspective view showing the aerial-drop device of the present invention in its nonuse condition, say in storage or transit before being dropped;

FIGURE 6 is a side elevational view of the device of FIGURE 5;

FIGURE 7 is an enlarged partial side elevational view showing the device of FIGURES 5 and 6 in greater detail; and FIGURE 8 is a sectional view taken generally along the line 8—8 of FIGURE 6, partly broken away to conserve drawing space.

Referring now more particularly to the drawings, and specifically to FIGURES 1 and 2 thereof, the aerial-drop device is there generally designated 10, and includes a container 11 provided with a plurality of wings 12.

The drop device 10 is advantageously fabricated substantially entirely of cardboard, such as corrugated cardboard, or other suitable material. The container 11 may be substantially conventional, including a bottom wall 13 of generally rectangular or square configuration, and a plurality of generally rectangular side walls 14 upstanding from respective sides or edges of the bottom wall 13 and defining a peripheral wall extending about and upstanding from the bottom wall. A generally rectangular or square top wall 15 may extend across the upper end of the container 11, between the upper end edges of the side walls 14.

As best seen in FIGURE 8, the bottom wall 13 may include a pair of inner flaps 16 extending inward from opposite side walls 14, and a pair of outer or lower flaps 17 extending inward from the remaining side walls 14 in underlying relation with respect to the inner flaps 16. Similarly, the top wall 15 may include inner or lower flaps 18 extending inward from a pair of opposite side walls 14, and a pair of upper or outer flaps 19 extending inward from the remaining opposite pair of side walls 14 in overlying relation with the inner flaps. Of course, the flaps 16, 17, 18 and 19 may be secured in their closed condition by any suitable means, such as adhesive, tape, or the like.

The container 11, as described hereinbefore, may be substantially conventional, and other suitable container constructions may also be employed, if desired.

The configuration of container 11 is shown as generally vertically elongate, and in FIGURE 8 it will be seen that the pay load or contents 20, to be delivered, may be packed in the container 11 spaced from the lower and upper container ends 13 and 15, as by lower and upper cushioning 21 and 22. The cushioning 21 may occupy the space between the lower side of the pay load or contents 20 and the bottom wall 13, while the cushioning 22 may occupy the space between the upper side of the pay load and the top wall 15.

The wings 12 may each include an elongate panel 25, say of corrugated cardboard, or the like, which may be of generally trapezoidal configuration. More specifically, each wing panel 25 may include a pair of generally parallel, longitudinal edges 26 and 27, and a distal end edge 28, which may extend between and generally normal to the longitudinal edges. The inner end edge of each wing panel 25 may be defined by a hinge connection or fold line 29 extending obliquely between the inner ends of longitudinal panel edges 26 and 27. Extending downwardly from each hinge connection or fold line 29, preferably integral with the respective adjacent wing panel 25 is a securement flap 30 in facing engagement with and secured fast to the adjacent container side wall 14, as by suitable fastening means 31. The securement flap 30 of each wing 12 is also of generally trapezoidal configuration, including a pair of parallel side edges 32 and 33 extending from opposite ends of the fold line 29, and a lower edge 34 extending between the lower ends of the side edges 32 and 33.

The dimension of each wing panel 25 between the opposite longitudinal edges 26 and 27 may be substantially equal to that of the respective adjacent container side wall 14; and further, the dimension between each pair of flap edges 32 and 33 may also be equal to that of the adjacent side wall 14, with the flap side edges in respective alignment with the wing-panel side edges when the wing panel is swung upward, as in FIGURES 5 and 6.

It will there be apparent that each wing 12 may be fabricated from an integral, rectangular sheet of cardboard, to define the wing panel 25 and its associated securement flap 30.

In the collapsed, storage condition of FIGURES 5 and 6, the wing panels 25 extend generally vertically, longitudinally of each other, and occupy substantially the same horizontal space as the container 11 without the wings.

Provided on the outer end region of each wing panel 25, adjacent to its end edge 28, may be secured a weight 35, as by fasteners 36.

When the wing panels 25 are swung laterally outward and downward from their upstanding storage position of FIGURES 5 and 6 to their laterally outstanding operative position of FIGURES 1 and 2, it will be apparent that the wings extend substantially radially from the container 11 in angularly spaced-apart relation with respect to each other. Further, the wing panels 25 in their laterally outstanding, radial position of FIGURES 1 and 2, are disposed obliquely, so as to define an acute dihedral angle with a horizontal plane. The dihedral angle may be aerodynamically considered as a negative angle of attack, with the drop device 10 rotating in the direction of arrows 40 and the longitudinal edge 26 of each wing being the leading edge.

It will now be appreciated that upon dropping of the device 10 and initiating axially spiral movement of the container 11, the wing panels 25 are swung to their laterally outstanding position by the centrifugal force of weights 35; and further, that the oblique dihedral angle or angle of attack of the wing panels operates in the manner of an airscrew to direct and retard descent of the device.

It will be observed that the inner ends or hinge connections 29 of the wing panels 25 are located at an upper region of the container 11, spaced above the center of gravity of the container to avoid a tumbling action.

Provided externally on the container walls 14 may be a plurality of guide vanes, each generally designated 42. The guide vanes are foldable in their collapsed condition flat against the respective side walls of the container, and adapted to be erected, as shown in FIGURES 1, 3 and 4, to initiate spiral movement of the container during drop. The vanes 42 may all be substantially identical, and each integrally fabricated of cardboard sheet material, or the like. Each vane may include a generally rectangular panel 43 having a hinged connection or fold line 44 along one longitudinal edge and there provided with a securement flap 45 secured fast in facing engagement with the adjacent container side wall, as by fasteners 46. The fold line 44 and longitudinal extent of the panel 43 are disposed obliquely, extending upwardly toward the right as shown in FIGURE 3, in an angular direction similar to but more vertical than that of the fold line or hinge 29 of the adjacent respective wing panel 25. Provided on one end edge, preferably the lower end edge of each panel 43 may be a strut or brace 47, of generally triangular configuration swingable about a fold line 48 between a flat position substantially coplanar with the panel 43 and an operative position generally normal to the latter panel. In the operative position of strut or brace 47, a tab 49 extends from the brace for interengagement through a hole or opening 50 formed in the adjacent side wall 14. This interengaging connection of brace 47 with the adjacent side wall 14 effectively maintains the panel 43 in its outstanding condition. The panel, by its aerodynamic action, serves to initiate the desired spiral dropping movement of the container 11, but occupies little or no space in the flat storage condition of FIGURES 5-8.

From the foregoing, it is seen that the present invention provides an aerial-drop device which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An aerial-drop device comprising a container, a plurality of wings extending radially from said container at a location above the center of gravity of the container, hinge means mounting said wings for free swinging movement between outstanding and upstanding positions, each of said wings being inclined in their outstanding position to define a negative angle of attack and produce spiral container movement upon dropping with the wings outstanding, centrifugal weights on said wings to maintain the latter outstanding during spiral dropping movement, and oblique vanes on said container arranged to initiate spiral movement during drop, said vanes each comprising an elongate panel hingedly connected along one longitudinal edge to a respective side of said container and swingable between a position in facing engagement with said container and a position outstanding from said container, and a strut connected to said panel and interengageable with the adjacent side of said container to maintain said panel in its outstanding position.

2. An aerial-drop device comprising: a container having a bottom, side walls and a top; a plurality of wings extending outwardly from said side walls; hinge means connecting said wings to said side walls for swinging movement between outstanding radial positions and upstanding longitudinal positions; said wings each being arranged obliquely in its outstanding radial position to spiral said container upon being dropped; centrifugal weights on said wings to maintain the latter radially outstanding during spiral dropping movement; and a plurality of vanes projecting from said side walls below said wings and each arranged obliquely to initiate spiral container movement upon being dropped.

3. An aerial-drop device according to claim 2, said hinge means comprising a cardboard flap integrally connected to the inner end of each wing by a fold line and fixedly secured to the adjacent side wall.

4. An aerial-drop device according to claim 2, said vanes each comprising a cardboard panel extending from a respective side wall, a cardboard flap integrally hinged to said panel by a fold line and fixed to the adjacent side wall, and a strut integrally hinged to said panel and interengageable with the adjacent side wall to maintain said panel in position extending from the adjacent side wall.

References Cited by the Examiner

UNITED STATES PATENTS

| | | | |
|---|---|---|---|
| 2,450,992 | 10/48 | Sanderson | 244—138 |
| 3,101,121 | 8/63 | MacNeal | 244—138 X |
| 3,115,831 | 12/63 | Suter | 244—138 X |

FOREIGN PATENTS

| | | |
|---|---|---|
| 1,003,132 | 11/51 | France. |

FERGUS S. MIDDLETON, *Primary Examiner.*